(12) United States Patent
Chang et al.

(10) Patent No.: US 8,233,157 B2
(45) Date of Patent: Jul. 31, 2012

(54) METHOD AND APPARATUS OF A PORTABLE IMAGING-BASED MEASUREMENT WITH SELF CALIBRATION

(75) Inventors: Tzyy-Shuh Chang, Ann Arbor, MI (US); Hsun-Hau Huang, Ann Arbor, MI (US)

(73) Assignee: OG Technologies, Inc., Ann Arbor, MI (US)

( * ) Notice: Subject to any disclaimer, the term of this patent is extended or adjusted under 35 U.S.C. 154(b) by 9 days.

(21) Appl. No.: 12/891,881

(22) Filed: Sep. 28, 2010

(65) Prior Publication Data

US 2011/0075159 A1 Mar. 31, 2011

Related U.S. Application Data

(60) Provisional application No. 61/247,010, filed on Sep. 30, 2009.

(51) Int. Cl.
*G01B 11/08* (2006.01)
(52) U.S. Cl. ....................................... 356/625
(58) Field of Classification Search ........... 356/601–613
See application file for complete search history.

(56) References Cited

U.S. PATENT DOCUMENTS

| | | | |
|---|---|---|---|
| 3,125,811 A | 3/1964 | Pierce et al. | |
| 3,773,422 A | 11/1973 | Stavis et al. | |
| 4,714,344 A | 12/1987 | Hamar | |
| 4,980,763 A | 12/1990 | Lia | |
| 5,070,401 A | 12/1991 | Salvati et al. | |
| 6,753,919 B1 | 6/2004 | Daugman | |
| 7,556,599 B2 * | 7/2009 | Rovegno | 600/175 |
| 2002/0188417 A1 | 12/2002 | Levy et al. | |
| 2003/0028348 A1 | 2/2003 | Wenzel et al. | |
| 2003/0209678 A1 | 11/2003 | Pease et al. | |
| 2005/0046702 A1 | 3/2005 | Katayama et al. | |
| 2007/0036426 A1 | 2/2007 | Kubota et al. | |
| 2007/0091321 A1 | 4/2007 | Hu et al. | |
| 2009/0037139 A1 | 2/2009 | Rust et al. | |
| 2009/0060386 A1 | 3/2009 | Cooper et al. | |

OTHER PUBLICATIONS

Ricklefs et al., Consolidated Laser Ranging Data Format (CRD), Version 0.26, Mar. 28, 2007.
International Search Report and Written Opinion of the International Searching Authority mailed Dec. 3, 2010 for PCT/US2010/050502.

* cited by examiner

*Primary Examiner* — Tara S Pajoohi Gomez
(74) *Attorney, Agent, or Firm* — Dykema Gossett PLLC

(57) ABSTRACT

A portable imaging-based measurement device is developed to perform 2D projection based measurements on an object that is difficult or dangerous to access. This device is equipped with self calibration capability and built-in operating procedures to ensure proper imaging based measurement.

25 Claims, 6 Drawing Sheets

FIG. 5
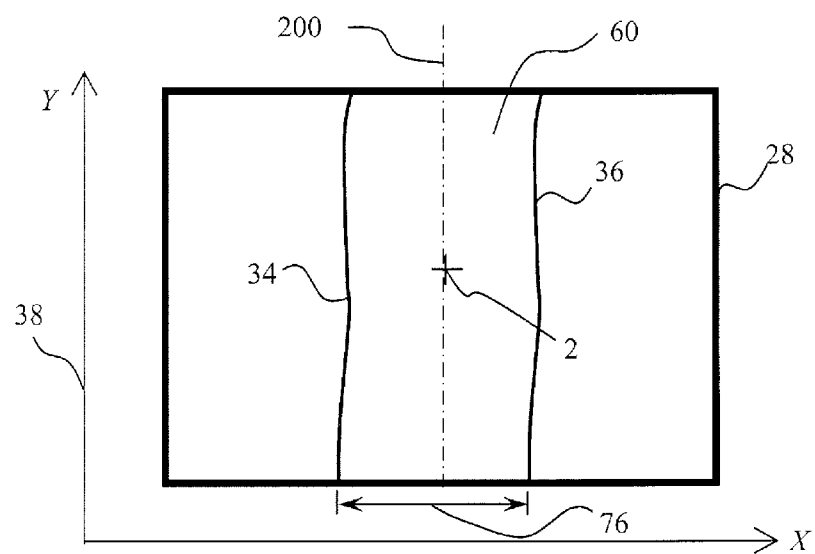
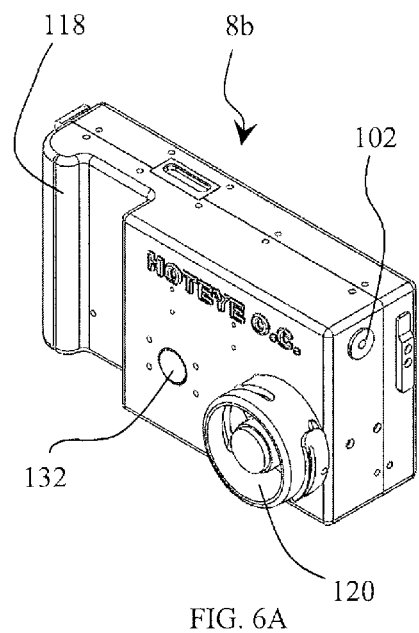
FIG. 6A
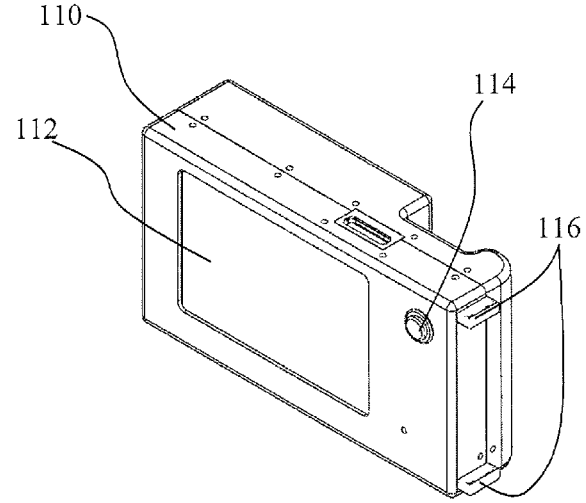
FIG. 6B

METHOD AND APPARATUS OF A PORTABLE IMAGING-BASED MEASUREMENT WITH SELF CALIBRATION

CROSS-REFERENCE TO RELATED APPLICATIONS

This application claims the benefit of U.S. Provisional Application Ser. No. 61/247,010 filed Sep. 30, 2009, the disclosure of which is hereby incorporated by reference in its entirety.

STATEMENT REGARDING FEDERALLY FUNDED RESEARCH

This invention was made with United States government support under Award No. DE-SC-0003254 awarded by the U.S. Department of Energy (DOE), Office of Science (SBIR), entitled "Recovery Act-Imaging-based Optical Caliper for Objects in Hot Manufacturing Processes". The United States government has certain rights in the invention.

TECHNICAL FIELD

The present invention relates generally to imaging based dimensional measurement, and specifically, to a portable imaging-based device that can be used for the measurement of critical dimensions of an object with built-in self calibration.

BACKGROUND OF THE INVENTION

Imaging based measurement is widely in use. One can find imaging-based measurement systems based on triangulation, interferometry or 2D projection. However, these devices are subject to good alignment, critical calibration procedures and typically sensitive to lighting conditions. This limits the ability to use these imaging instruments on a portable basis.

It is preferable to have a non-contact dimension measurement device that is inexpensive and portable for certain applications. For instance, in a steel rolling mill, the roll closure (the gap between two rolls) is a critical parameter relating to the quality of the finished products. While fixed location dimensional measurement instruments are commonly available to the steel mills, they are too expensive to be installed after every rolling stand. Therefore, these instruments are typically installed at the finishing end, after the last rolling stand. Nevertheless, there is a need to verify the dimensions after every stand on a periodic basis, such as after a new machine setup or after a predetermined time period (e.g., every 30 minutes). The difficulty involved in taking such a measurement is that the object to be measured is not only very hot, typically ranging from 700° C. to 1,250° C., but is also moving. It is not practically possible to stop the object for measurement because a constant no-moving contact can damage the rolls. There are two practices now for taking a measurement for the hot object while moving. The first practice is to use a hand-held caliper for those objects moving at a relatively slow speed, such as after a roughing mill. In this practice, an operator must bring a caliper into contact with the hot moving object to obtain the measurement. As may be appreciated, this practice is somewhat dangerous and potentially inaccurate. The other practice, for objects moving at a faster speed, such as after an intermediate mill, involves using a piece of a specially treated wood. The wood piece is held against the hot, moving object, thereby allowing the hot object to burn a portion of the wood piece into the shape of the object. The worker then measures the burned portion to obtain the dimension of the object. A portable non-contact dimension measurement device could find itself valuable in this application.

Further, it is known to use a hand-held optical instrument for measuring a distance to an object (e.g., such as a range finder); however, such a device does not help when the dimension of the object is desired. In addition, a LIDAR (light detection and ranging) system is known in the art, which is capable of scanning with a laser beam for topographical data, but such a system is expensive and not portable.

One challenge in providing a portable two-dimensional (2D) projection based measurement device is that the projection size in an image may be greatly affected by the setup and/or configuration, or known as the spatial relationship between the imaging sensor, typically a camera, and the object to be measured. Portability in such a measurement device thus prevents knowing in advance the object-to-measurement device spatial relationship.

Another challenge in providing a portable measurement device is the unknown nature of the lighting conditions and setup the may exist at a time and place when a measurement is desired to be taken. In particular, those of ordinary skill in the art know that in general, the quality of an image may greatly affect the information that can be extracted from the image, which for present purposes would greatly affect measurement results. For example, it is undesirable to have any portion of the object to be measured so bright that it will saturate (i.e., image brightness over the limit) the imaging system. Such saturation effect will cause the boundary detection algorithms, used to define the boundaries of an object to derive the dimensions, to fail. Furthermore, such saturation may cause a spill over effect, with excessive photons flooding adjacent image pixels (i.e., in typically used imaging technologies). This will result in a swollen object in the image, thereby causing faulty measurements. It is also undesirable to have the object too dark, in that the imaging sensors will behave non-linearly, due to the so-called dark current effect. Dark current effect is caused by long wavelength photons penetrating into the substrate of the imaging sensor. When the brightness is low (e.g., less than 15% of the full scale, for instance), the dark current effect may distort the image, particularly the object boundaries. In contrast to a portable device, in a fixed installation, a typical imaging system may experience the benefit of a fixed and well-controlled lighting environment to ensure proper exposure and working range. However, as suggested, this outcome is almost impossible for a portable device because the lighting conditions and setup cannot be known in advance. Even today's digital cameras, equipped with automatic electronic shutter, aperture and flash lights, cannot fully address some extreme cases, such as imaging a steel bar at 1,000° C.

There is therefore a need and value to design a measurement device, capable of portable use and capable of measuring object dimensions based on 2D projection, that eliminates or minimizes one or more of the problems or shortcoming described above.

SUMMARY OF THE INVENTION

The present invention provides a measurement apparatus for determining a dimension of an object. The apparatus includes an imaging system, a parameter identifier and a computing unit. The imaging system is configured to acquire an image of the object. In one embodiment, the image may be the two-dimensional (2D) projection of the 3D object as captured on an imaging sensor. The parameter identifier is configured to determine at least one calibration parameter, preferably during or near in time to the actual image capture (i.e., self-calibration at measurement time). In an embodiment, the at least one calibration parameter may comprise a working distance from the imaging system to the object. The parameter identifier does not need to have information in advance of the image capture of the spatial relationship to the object, which makes embodiments of the apparatus suitable for portable use. The computing unit is configured to determine the dimension of the object from the image based on the at least one calibration parameter.

In an embodiment, the computing unit is further configured to determine a dimensional model. The dimensional model reflects the measurement-time calibration that enables the use of the apparatus for dimensional measurements. The apparatus is calibrated such that the actual dimensions of a physical object can be mapped onto the image grid, which is expressed in pixels. With this model, the computing unit analyzes the image so as to determine (i.e., "count"), for example, the number of pixels in the image between boundary lines of an object. The boundary lines (edges) of the object in the image may be identified (i.e., by the computing unit) through execution of image processing techniques, known as edge detection algorithms. The computing unit uses the determined object dimension (in the pixel space), in conjunction with at least the dimensional model, to arrive at the actual dimension of the object in physical space.

In one embodiment, the model includes (1) a relatively accurate estimation of the working distance—a system calibration parameter determined at measurement time (moment of imaging) and corresponding to the distance from the imaging system (i.e., lens) to the object being imaged, and (2) a lens focus length—typically known in advance and corresponding to the distance from the lens optical center to an imaging sensor part of the imaging system.

In alternate embodiments, the apparatus includes an ability to generate display readouts to guide a user in making adjustments to certain settings (e.g., focus, exposure, etc.) so as to ensure acceptable quality image (e.g., in gray scale, no saturation).

In still further embodiments, the apparatus may further include the ability to generate display readouts that allow users to identify and select the shape and/or configuration of the objects to be measured, such as a straight bar, a rectangular box, a circle, and so forth. Therefore, acquiring additional spatial relationships such as the existence of "parallel boundary lines", "perpendicular boundary lines" and the like. The information is then used by the apparatus to overcome the difficulty of alignment with a handheld device.

Embodiments of the inventive apparatus, in view of the built-in functionality to address both unpredictable spatial relationships as well as unpredictable lighting setup and conditions, are suitable for portable use and may be used to obtain dimensional measurements for difficult to access objects, such as those at an elevated temperature or those in a narrow space.

The foregoing and other aspects, features, details, utilities, and advantages of the present disclosure will be apparent from reading the following description and claims, and from reviewing the accompanying drawings.

BRIEF DESCRIPTION OF THE DRAWINGS

The present invention will now be described by way of example, with reference to the accompanying drawings:

FIG. 3 is a diagrammatic and block diagram view of a measurement apparatus, in a further embodiment.

FIG. 5 is a diagrammatic view of an image of a 3D object, showing boundary lines (edges) of the object, in relation to a two-dimensional (2D) coordinate system onto which the object is projected and being corrected for alignment.

FIGS. 6A-6B are isometric views of the front and back, respectively, of a measurement apparatus, in a still further embodiment.

DETAILED DESCRIPTION OF THE PREFERRED EMBODIMENT

Figure 1:
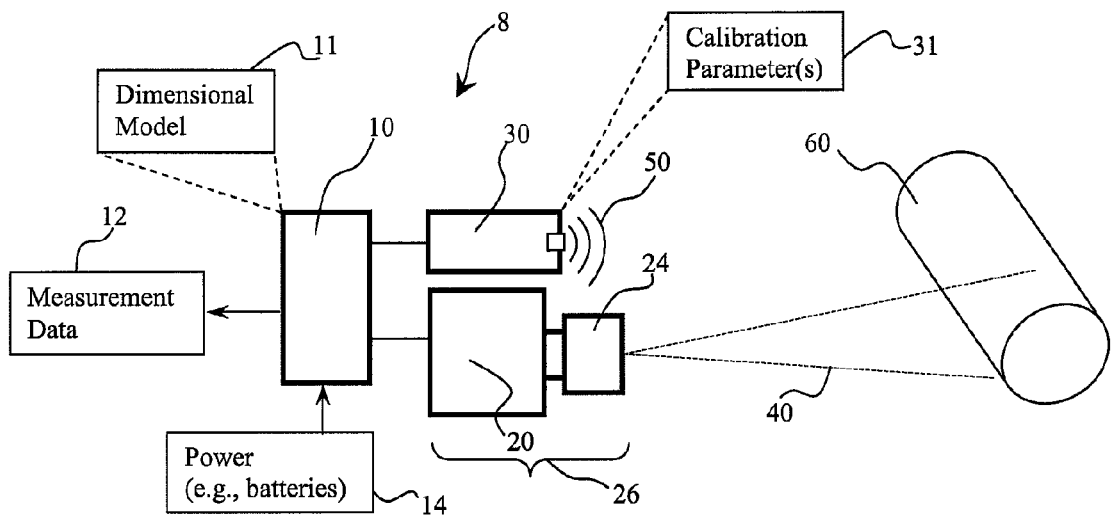
FIG. 1 is a schematic and block diagram view of an apparatus for determining a dimension of an object (measurement apparatus), in one embodiment.

Referring now to the drawings wherein like reference numerals are used to identify identical components in the various views, FIG. 1 is a diagrammatic and block diagram view of an apparatus 8 for determining a dimension of an object (hereinafter sometimes referred to as a "measurement apparatus"). As shown, apparatus 8 includes a computing unit 10 configured to output measurement data 12 (e.g., an object dimension in physical space) using at least a dimensional model 11, a source of power 14, an imaging system 26 (including at least an imaging device 20 and a lens 24) configured to acquire an image of a target object 60, and in-situ parameter identifier 30 configured to determine at least one system calibration parameter 31.

Computing unit 10 may include conventional processing apparatus known in the art, capable of executing pre-programmed instructions stored in an associated memory, all performed in accordance with the functionality described in this document. It is contemplated that the methods described herein, at least in one embodiment, will be programmed with the resulting software being stored in an associated memory and where so described, may also constitute the means for performing such methods. Implementation of the invention, in software, in view of the foregoing enabling description, would require no more than routine application of programming skills by one of ordinary skill in the art. Such a computing unit may further be of the type having both ROM, RAM, a combination of non-volatile and volatile (modifiable) memory so that the software can be stored (embodied) and yet allow storage and processing of dynamically produced data and/or signals. One of ordinary skill in the art will appreciate that computing unit 10 may additionally and/or alternately include or be coupled with supporting hardware of various kinds, particularly in light of its image processing functionality described below.

Dimensional model 11 is configured to allow computing unit 10 to convert an object's dimension (in pixel space) to an object's dimension (in physical space of the object). Model 11 may be implemented as a data structure embodied in a memory associated with computing unit 10. Details of an exemplary embodiment of model 11 will be set forth below.

Measurement data 12 comprises dimensional information concerning object 60 including, but not limited to, the dimension of object 60 in physical space (e.g., for a longitudinally-extending bar that is round/circular in cross-section, the dimension may be the bar's diameter). It should be understood, however, that other information concerning the dimension measurement event may be stored and output by apparatus 8 (e.g., see FIG. 10 and related description).

Power source 14 is configured to provide operating power for the other portions of apparatus 8. In an embodiment, power source 14 may comprise conventional batteries (e.g., replaceable and/or re-chargeable) suitable for adapting apparatus 8 for portable use.

Imaging system 26 is configured to acquire an image of object 60 (i.e., the object whose dimension is to be determined). The image so obtained may be organized in a two-dimensional array (X, Y), for capturing the two-dimensional (2D) projection of a three-dimensional (3D) object 60 thereon. Imaging system 26 may include a plurality of sub-components, including imaging device 20 and lens 24. The lens 24 may have a predetermined focal length ($D_f$) that is selected to provide a corresponding, desired field of view. It should be understood that various constituent components of imaging system 26 have been omitted for clarity. Imaging system 26 may comprise conventional components.

In-situ parameter identifier 30 is configured to acquire system calibration parameters, shown in block form as calibration parameters 31, during or at least near in time to the capture of an image of object 60 whose dimension is to be measured.

For a measurement of the object's dimension, imaging system 20 is used to capture the image of target object 60 through a principle of line of sight 40. While a single apparatus 8 is primarily useful for determining a dimension of object 60, if multiple apparatuses are synchronized to take measurements from different perspectives of the object, the resulting plurality of measurements can be used to determine features of the object, for example, to determine geometric measurements such as eccentricity and ovality.

It should be understood, however, that computing unit 10 cannot determine the size or dimension of object 60 with the object's image alone. Certain additional parameters are required. As described briefly above in the Summary, apparatus 8 must be calibrated at the same time or sufficiently near the image capture time to account for and prevent adverse affects of movement of the apparatus, changes in lighting, etc. Computing unit 10 can then determine from the object image an object dimension in pixel space which is converted into an object dimension in physical space. To achieve this end goal, the image pixel size must be therefore be determined ("calibrated") at the same time (or near so) as the image is taken. To facilitate this calibration, parameter identifier 30 is used to detect necessary parameters, such as the working distance (best shown in FIG. 3) between imaging lens 24 and object 60 by way of a parameter detecting means 50. The parameter detecting means 50 may comprise conventional components known in the art, for example, may be structural lighting, such as laser spot, ultrasonic wave, or other known technologies, and in accordance with known approaches, such as optical triangulation, interferometry, and/or sonic/ultrasonic response. Generally, the information obtained by the imaging system 26 (e.g. image) and parameter identifier 30 (e.g., system calibration parameters 31) are processed by computing unit 10 to determine measurement data 12 (e.g., the object's dimension).

Figure 11:
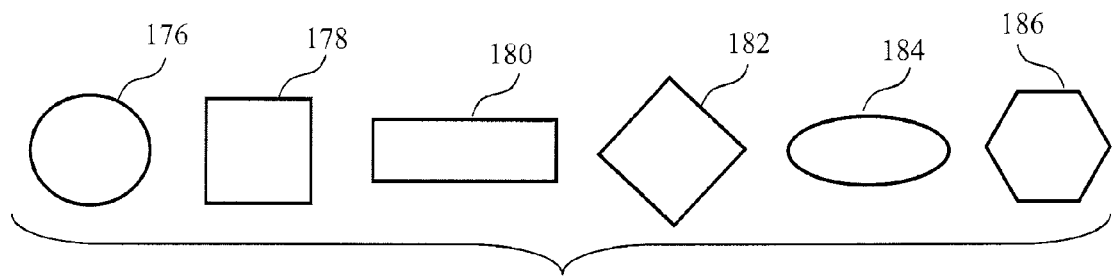
FIG. 11 are simplified cross-sectional views of various object geometries (shapes).

The object 60 whose dimension in physical space is to be measured may take a wide variety of forms. For example, in one embodiment, object 60 may comprise a relatively hot (700° C. to 1,250° C.), moving rod of metal (e.g., steel), such as may be found in a steel mill or the like. Such an object 60 may take wide variety of radial cross-sectional geometries (shapes), such as illustrated in FIG. 11. As shown in FIG. 11, such shapes may be round (circular) 176, square 178, rectangle 180, diamond 182, oval 184 or hexagon 186, to list a few.

In the view of the possible variation in geometry, shape, etc. of object 60, a further system calibration parameter 31, in an embodiment, may be the degree of parallelism and/or perpendicularity of edges of object 60 in the 2D projection plane. In an embodiment, to take a measurement of an object properly would require that the dimensions of an object to be measured are in the same plane that is perpendicular to the camera (lens) principal axis line. For hand-held, portable measuring devices, this requirement is a practical impossibility (i.e., no perfect alignment). To measure an object such as the diameter of a straight round bar, for instance, apparatus 8 may be configured to assume or otherwise force the object's edges to be parallel (e.g., the 2D projection of 3D the object, as seen in the acquired image, is expected to be a rectangle). These assumptions may be embedded into the software of computing unit 10 for a "diameter measurement", in the case of a round object.

Figure 4A:
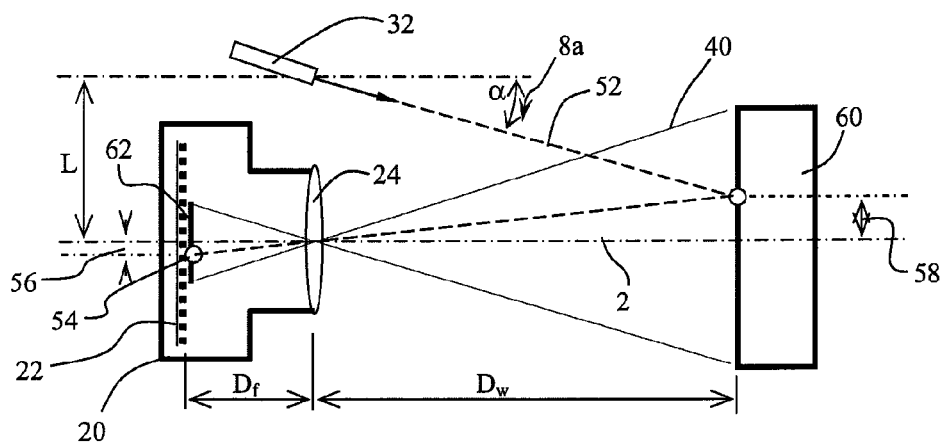
FIGS. 4A-4B are diagrammatic views of an image of a 3D object, showing boundary lines (edges) of the object, in relation to a two-dimensional (2D) coordinate system onto which the object is projected.
Figure 4B:
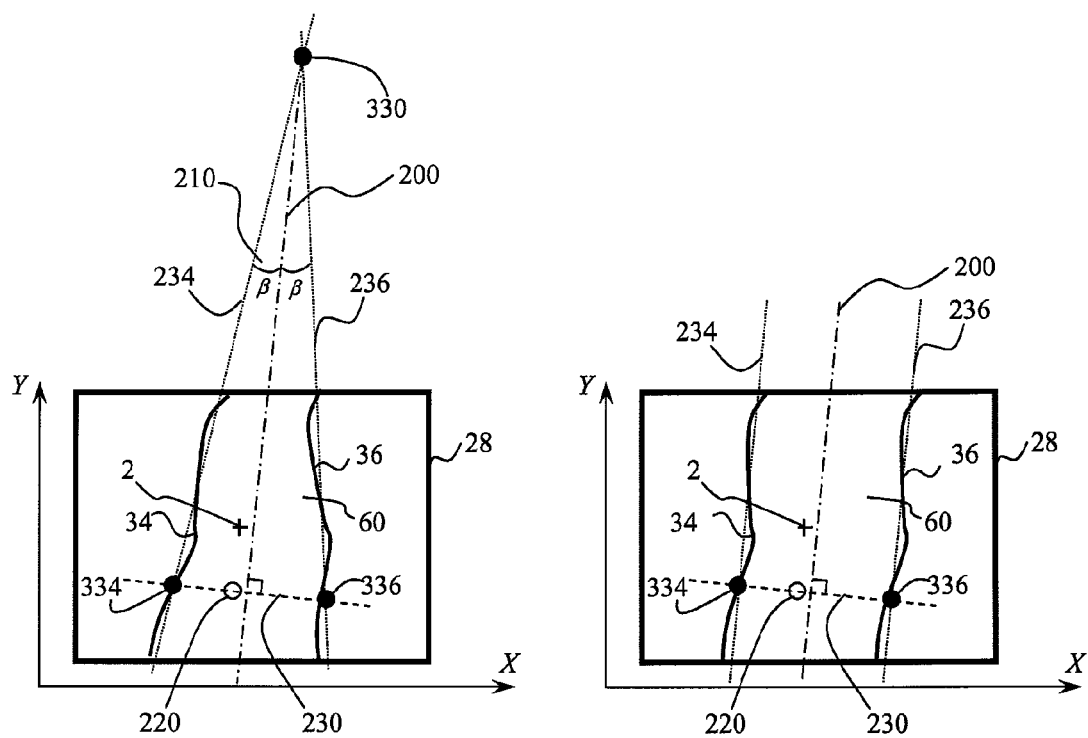

As an example, FIG. 4A represents a typical picture of a 2D projection of a straight round bar. Those experienced in the art shall know that the bar boundaries 34 and 36 would not be straight and parallel in the original image due to movements of the object 60 or the portable apparatus 8, as well as the non-perfect alignment. To overcome this issue, this invention adopts the approach of applying the advance knowledge of the 2D projection shape of the object to be measured for correcting misalignment. That is, with the knowledge of the 2D projection shape being a "rectangle", the software in the computing unit 10 would be able to "force the boundaries 34 and 36 to be parallel", as illustrated in FIG. 4B. Specifically, the following steps can be followed by the computing unit 10 (this example assumes the expected shape to be a rectangle):

The first step (a): A best fit straight line 234 can be generated as $y=a_{34}x+b_{34}$, in which $a_{34}$ and $b_{34}$ are the mathematical slope and offset of the line equation, for the boundary 34. Similarly, a best fit line 236 $y=a_{36}x+b_{36}$ can be generated for the boundary 36.

The second step (b): Check if the two best fitted lines 234 and 236 are parallel (whether $a_{34}=a_{36}$). If they are parallel, it is not necessary to force for parallelism.

The third step (c): If lines 234 and 236 are not parallel, there would be an intersection point 330, which can be mathematically solved for. This intersection point 330 would be the theoretical disappearing point of the two parallel lines due to a perspective view.

The fourth step (d): With this intersection point 330, we can define a centerline 200 of the object 60 by equally splitting the angle 210 between lines 234 and 236 (each of the resulting two equal angles being denoted β). The two boundary edges 34 and 36, should be parallel to this centerline 200 if the measurement plane is perpendicular to the camera principal axis 2.

The fifth step (e): The next step is to define the points of invariant. As the diameter measurement depends on the working distance, we will fix the points on the boundaries 34 and 36 associated with the spot 220 where the working distance is measured on the object 60. This is possible, particularly with the embodiment of a laser spot (see below description in connection with the embodiment of FIG. 3). A line 230 that passes through the spot 220 and is perpendicular to the centerline 200 can be generated and intersect with both lines 234 and 236, resulting in two stationary points 334 and 336.

The sixth step (f): With now the constraints of having the centerline 200 and the points 334 and 336 being stationary (invariants during the image transformation mapping), we can perform the image mapping to convert the original image as in FIG. 4A into the alignment-corrected image shown in FIG. 4B.

Those skilled in the art shall know that there exists image mapping algorithms to transform an image with two unparallel lines into an image with two parallel lines. It is also possible to further transform (e.g., by rotation) the corrected image in FIG. 4B into one shown in FIG. 5, in which now the centerline 200 is parallel to the Y axis, for the ease of computing the distance between edges 34 and 36. A user of apparatus 8 need not even be aware of this working assumption.

For certain other shapes, apparatus 8 may be configured to "assume" a few known features of the 2D projection of the object, such parallelism (or perpendicularity) of certain edges (with respect to other edges), or of prismatic shapes. Based on these programmed assumptions, computing unit 10 is configured to process all the acquired data, through the dimensional model such as converting an oval into a circle, a trapezoid into a rectangle, to arrive at the object's dimension(s) (in physical space).

In alternate embodiments, computing unit 10 may be configured with a user interface that will display multiple shape/geometry choices to a user and provide a mechanism for the user to select the desired working assumptions (e.g., which edge will be perpendicular or parallel to another edge, etc.) on the 2D projection. For example, this interface may be akin to allowing the user to select the shape of the object (e.g., round, square, etc.—see FIG. 11). This user interface may be particularly useful when apparatus 8 is adapted for measuring the dimension(s) of complex geometry objects (e.g., a box).

In yet another embodiment, computing unit 10 may be configured with a user interface that will display the image with detected "edges", and allow users to select the edges and assign relations (e.g., parallelism, perpendicularity, roundness, angle, etc.). Taking FIG. 4A as an example, the image frame 28 would be displayed to the user after the snapshot with the boundaries 34 and 36 detected. The user can then select boundaries 34 and 36, and assign the "parallelism requirement" between the two boundaries for the computing unit 10 to further process the image.

With continued reference to FIG. 1, although parameter identifier 30 is shown as a separate block from computing unit 10, it should be understood that this separation is for description purposes only, and that certain computational steps performed by computing unit 10 and parameter identifier 30 may in fact be performed on the same processing unit. Parameter identifier 30, in whole or in part, may be but need not be a separate component.

Figure 2:
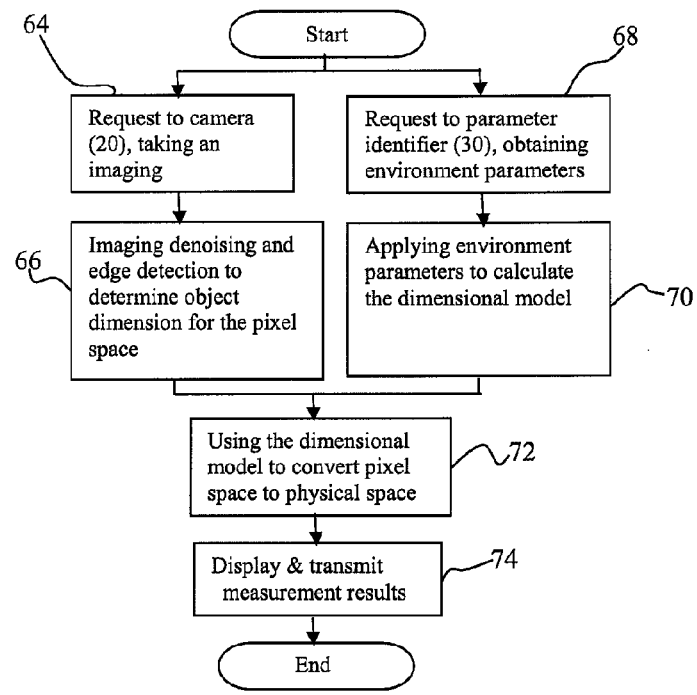
FIG. 2 is a flowchart showing a method of determining a dimension of an object in physical space.

FIG. 2 is a flowchart showing a method of determining a dimension in physical space of a target object. The method begins in a "Start" step, which marks the start of a measurement cycle, typically initiated by the user by depressing a key on apparatus 8.

In steps 64 and 68, computing unit 10, upon commencement of a measurement cycle, will initiate requests to imaging device 20 and parameter identifier 30 for needed data. As described generally above, imaging system 20 will acquire an image (including the 2D projection of the object) and parameter identifier 30 will determine one or more system calibration parameters 31, for example, a working distance as defined above. The method then proceeds.

In step 66, computing unit 10 may pre-process the acquired image of the object, for example, through image de-noising or the like. Thereafter, computing unit 10 will determine the object's dimension in pixel space. The pixel space is the coordinate system space of the image obtained by imaging device 20. Computing unit 10 may employ conventional algorithms, such as edge detection algorithms, in order to determine object boundaries and thus the object dimension(s) in pixel space. In other words, the distance(s) between selected edges of object 60 in the image can be determined by computing unit 10, thereby establishing that dimension in pixel space. Those of ordinary skill in the art will appreciate that a variety of different image processing approaches may be employed to identify the object boundaries and then to determine the pixel distance therebetween. The foregoing may constitute a means for determining an object dimension from the image in the pixel space.

In step 70, computing unit 10 will use system calibration parameters 31 obtained from parameter identifier 30 to establish dimensional model 11, which enables computing unit 10 to convert the object dimension(s) in the pixel space into the object dimension(s) in the physical space of the object. An exemplary embodiment of model 11 will be described below. The foregoing may constitute a means for establishing a dimensional model in accordance with the determined system calibration parameters.

In step 72, computing unit 10 applies dimensional model 11 to convert the pixel space dimension(s) into physical space dimension(s). The foregoing may constitute a means for converting the object dimension in the pixel space into the object dimension in the physical space in accordance with the dimensional model.

In step 74, computing unit 10 displays the determined object dimension (e.g., on a display screen associated with apparatus 8), may store the determined object dimension for later retrieval, and/or transmit the determined object dimension to another computing unit (e.g., see FIG. 10 and related description of a networked data center computer).

FIG. 3 is a diagrammatic and block diagram of an alternate measurement apparatus embodiment 8a. One of ordinary skill in the art will recognize that the following description of apparatus 8a is exemplary only and not limiting in nature—there are many ways to implement embodiments of the present invention.

In the illustrated embodiment, parameter identifier 30 includes a laser spot source 32. Laser spot source 32 is placed at a location and an attitude that is fixed with respect to the imaging device 20. As shown in FIG. 3, laser spot source 32 is offset from imaging device 20 by a known distance L. Also, laser spot source 32 is configured to project its laser spot 52 at a known angle α with respect to a direction parallel to the normal line of the imaging device 20. In an embodiment, the laser spot source 32 is configured to project its laser beam in the field of view of the imaging system. The parameter detecting means 50, in the illustrated embodiment, is the laser spot 52.

As the laser spot 52 impinges the outer surface of object 60, a representation of the laser spot in the image, designated by reference numeral 54, is formed on an imaging chip 22 in the imaging device 20 by lens 24. Computing unit 10 is configured, through image processing, to distinguish the image of laser spot 54 from other imaging features, for example, by the combination of intensity, pattern, position and others (i.e., in other words, to recognize the representation of the laser spot 54 in the acquired image). Computing unit 10 will then determine attributes of laser spot 54, perhaps the most significant of which is the position of laser spot 54 in the pixel space. However, computing unit 10 is configured to analyze certain factors associated with the laser spot 54 in order to accurately calculate the spot position in the pixel space. These other factors may include but are not limited to the observed spot shape and intensity distribution, among other factors. By analyzing the attributes of the image of laser spot 54 (e.g., the position of laser spot 54 in pixel space), along with the known location and attitude parameters (such as L and $\alpha$) of laser spot source 32 and the focal length $D_f$ of lens 24, computing unit 10 can determine, in real-time, system calibration parameters 31, such as the working distance $D_w$. In an embodiment, the parameter identifier 30 is configured to determine a system calibration parameter 31 (e.g., working distance) during the image acquisition.

For instance, computing unit 10 may be configured to calculate distance 56, denoted as $d_I$, between the image of laser spot 54 and principal line 2 of imaging chip 22. Those skilled in the art shall know that $d_I$ can be a physical quantity (i.e., defined in the physical space of the chip) if the pixel size on imaging chip 22 is known in advance. Computing unit 10 is thus configured to derive the working distance $D_w$ as follows:

$$D_w = L/(d_I/D_f + \tan \alpha), \quad (1)$$

in which L, $D_f$ and $\alpha$ are predetermined data associated with the laser spot source and imaging system known to the computing unit and $d_I$ can be obtained by computing unit 10 via image analysis.

Once computing unit 10 determines the working distance $D_w$, computing unit 10 can further derive other measurement parameters such as the image pixel sizes of the object image 62 and thus the mapped dimensions of the object 60 in physical space. In FIG. 3, distance 56 on imaging chip 22 corresponds to a physical distance 58 on the object.

FIG. 4A is a representation of an image of an object, showing boundary lines (edges) of the object, in relation to a two-dimensional (2D) coordinate system. In FIG. 4A, an image 28 contains a representation of object 60, with a pair of edges 34, 36 extending in a generally vertical direction in the Figure but not corrected for parallelism. The image 28 would be corrected by way of the assumption of parallelism such that edges 34 and 36 are now parallel with each other and with respect to a centerline but where the centerline remains at an angle with respect to the Y-axis, as in FIG. 4B. Finally, the image 28 may be still further transformed such that edges 34 and 36 (and centerline) are now substantially parallel to the Y axis, as in FIG. 5.

With respect to FIG. 5, principal axis 2 extends into the paper. Furthermore, image 28 is shown in relation to a 2D coordinate system (X, Y), designated coordinate system 38. In the illustration, for a given position off the principal line 2 of a feature (e.g., a first edge) on object 60, there would be a mapped position on imaging chip 22. Through image analysis, computing unit 10 can determine a corresponding physical position relative to the principal line 2 on imaging chip 22 and then calculate the physical position off the principal line 2 on object 60 by an amplification factor $D_w/D_f$.

Accordingly, in an embodiment, dimensional model 11 may include (i) a factor to convert pixels (e.g., counted between edges) from the image to a physical dimension on imaging chip 22; and (ii) an amplification factor defined by $D_w/D_f$ to convert the physical dimension of the object's projection on the imaging chip 22 to a physical dimension of or on the object itself.

For example illustrated in FIG. 5, computing unit 10 may be configured to determine the edge to edge distance 76 of object 60. This is shown as the X-axis distance (dimension) between edge boundaries 34, 36. Computing unit 10 will determine a first physical position off the principal line 2 for the first edge 36 (hereafter $D_{36}$) and a second physical position for the second edge 34 (hereafter $D_{34}$). Then, computing unit 10 may compute the distance (i.e., dimension) between the two edges 34, 36 through simple subtraction $D_{36} - D_{34}$.

In summary, parameter identifier 30 in this embodiment comprises laser spot source 32 and imaging device 20, and parameter detecting means 50 is laser spot 52. Those skilled in the art shall know that the laser spot can be replaced by other structured light and may be in different shapes, colors and radiating sources, such as a laser line or a projected line image, among other implementations. Other than the implementation as in FIG. 3, those skilled in the art shall also know that the parameter identifier 30 can also comprise other technologies such as a laser interferometer, a sonic or ultrasonic echo detector, and/or other means.

FIGS. 6A-6B are isometric front and back views, respectively, of a still further measurement apparatus embodiment 8b, reflecting measurement apparatus 8a of FIG. 3. Apparatus 8b thus also includes a computing unit 110, an imaging device 120 and a laser source 132 that are integrated therein. Laser source 132 is fixed with respect to imaging device 120. Imaging device 120 is comprised of a camera and a lens. The lens could have manual or automatic iris and focus controls. Apparatus 8b as shown includes a grasping handle 118 and strip mounting ears 116, to facilitate portability and hand-holding operations. Computing unit 110 also has a screen 112 and a control button 114. It can be operated from hard buttons such as the control button 114 or preferably through a touch screen, to minimize the number of hard buttons. Apparatus 8b may be operated using battery power. Apparatus 8b further includes a charger jack 102 provided in the body/shell for recharging the re-chargeable batteries included as the power source. Apparatus 8b may also include a standard camera mounting hole (¼"-20—not shown) such that apparatus 8b may be used on standard tripods.

Figure 7:
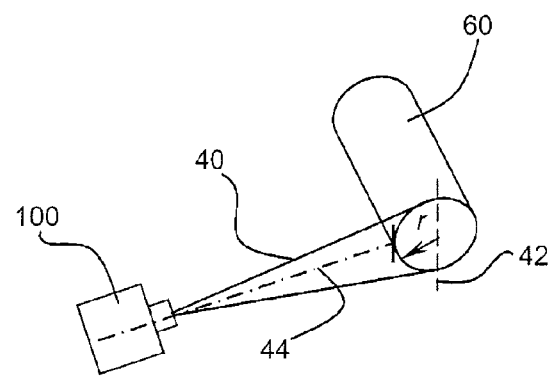
FIG. 7 is a schematic view of a measurement apparatus and an object showing a first source of geometric error.

FIG. 7 is a schematic view of a measurement apparatus and an object showing the possible occurrence of a measurement error. In particular, there is a not insignificant source of error from the geometric variation of the object to be measured. As illustrated in FIG. 7, an apparatus 100 is used to measure the two-dimensional (2D) projected diameter of object 60. Without loss of generality, the instant example shows that object 60 is round/circular in radial cross-section, although it should be understood this is exemplary only and not limiting in nature (the object may take the form of many other shapes—see FIG. 11 and related description).

The diameter of object 60 to be measured in this case is 2r, in which r is the radius of the round bar (object 60). Nevertheless, the working distance measured by the integrated sensor in apparatus 100 would be distance 44, hereby designated as w. This working distance 44 ("w") is different that the working distance ("W") from the lens of apparatus 100 to the measuring plane 42 of the object 60. FIG. 7 also shows line of sight 40 for reference. This difference in the actual working distance versus the apparent working distance (W-w), unless corrected or otherwise accounted for, can cause an error in the object dimension calculation, which is, as described above, based on the working distance measured to be w.

Figure 8:
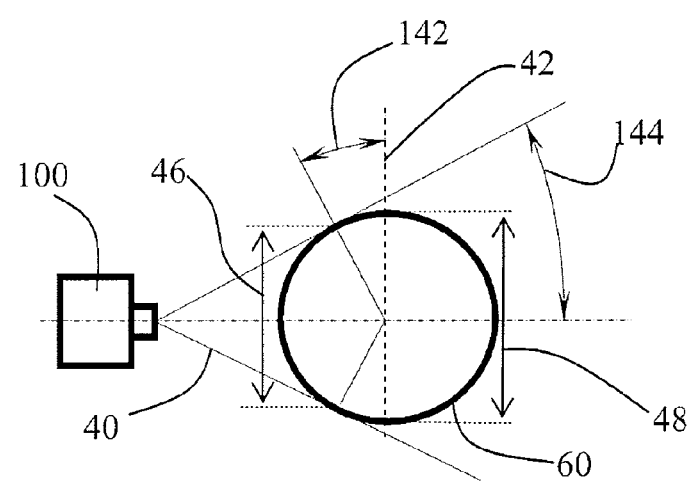
FIG. 8 is a schematic view of a measurement apparatus and an object showing a second source of geometric error.

FIG. 8 is a schematic view of apparatus 100 and object 60 showing a second source of error. While the first source of error above involved an error in the apparent working distance, another source of error may arise due to perspective error. The diameter 46 that is actually measured (now with perspective error), hereby designated as d, is due to the fact that the line of sight is different from that needed to view the actual diameter 48, hereby designed as D. Nevertheless, those skilled in the art would appreciate that actual diameter 48 ("D") can be derived from the measured diameter d based on trigonometry, taking note that angle 144 is the same as angle 142, which for reference purposes will be designated as angle θ. Based on the foregoing, actual diameter 48 ("D") may be determined as a function of the measured diameter d, or $$D=f(d)=d/\sin\theta. \quad (2)$$

Figure 9:
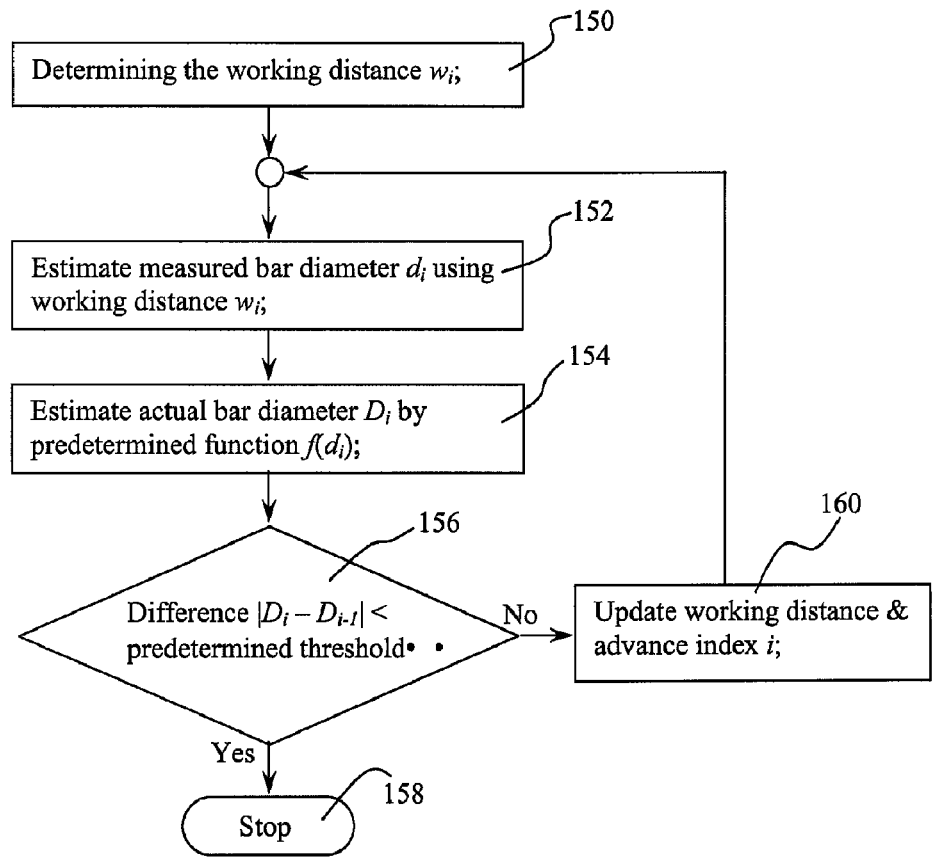
FIG. 9 is a flowchart showing a method for adjusting an object dimension to correct for geometric errors, as may be incorporated in a still further measurement apparatus embodiment.

FIG. 9 is a flowchart showing a method for adjusting a system calibration parameter, namely the working distance, so as to arrive at an object dimension this is compensated to correct for the above-noted geometric errors. To overcome the foregoing described errors, computing unit 10, in an embodiment, is configured to perform the following method:

1. (Step 150): Determining the working distance $w_i$. This step may be performed as described above.

2. (Step 152): Estimate measured bar diameter $d_i$ using $w_i$. This step may be performed as described above. This step may constitute a means for determining a measured object dimension using the current value of the calibration parameter.

3. (Step 154): Estimate actual bar diameter $D_i$ by $f(d_i)$. This step may be performed by evaluating the function $f(d_i)$. This step may constitute a means for computing a corrected object dimension as a function of the current measured object dimension wherein the function $f(d_i)$ is defined at least in part on the cross-sectional geometry of the object to be measured.

4. (Step 156): if $|D_i - D_{i-1}|$<threshold, stop (Step 158). This step may constitute a means for determining a difference between the current corrected object dimension and the most recently computed corrected object dimension computed in the previous step (step 154). The threshold is selected based on a desired level of accuracy.

5. (Step 160): $r_i = D_i/2$.

6. (Step 160): $w_{i+1} = w_o + r_i$. This step (and the previous step $r_i = D_i/2$) may constitute a means for updating the current value of the calibration parameter (e.g., working distance) when the difference in step 156 is not less than the threshold.

7. (Step 160): Advance index and repeat steps 2 to 6.

Note that the steps (2) through (6) above are intended to continue to search for an update to add to the originally-calculated working distance parameter until the updated working distance parameter (initial value plus the updated, incremental value) results in a suitably accurate object dimension. The final (compensated) value of the actual bar diameter $D_i$ (object dimension) when the method stops may be used as the outputted object dimension. Alternatively, the final (compensated) object dimension may be calculated based on the updated working distance (i.e., the current value of the term $w_{i+1}$) when the method stops. Either of these approaches may constitute a means for calculating a final, measured object dimension based.

Further, note that the term $w_o$ above represents the initial value of the working distance as calculated based on methodology outlined above in connection with FIGS. 1-5, and stays the same as the method loops (i.e., only the term $r_i$ updates as the method loops as the actual bar diameter D gets closer and closer to an accurate value). The foregoing steps may constitute a means for adjusting one or more system calibration parameters to correct for geometric errors.

Those of ordinary skill in the art will appreciate that the function $f(d)$ described above is dependent on the cross-section geometry of object 60, although the 2D projection of object 60 (i.e., as seen in the acquired image 28) is a rectangle. In one embodiment, apparatus 100 is configured to default to a round/circular shape (i.e., as taken in radial cross-section) when performing the above-described adjustment to correct or compensate for geometrical errors. In an alternate embodiment, however, apparatus 100 is configured with a user interface configured to allow a user to select an object cross-section shape that the computing unit will use to select the corresponding geometry dependent function $f(d)$ in refining the measurement results. Exemplary shapes documented in FIG. 11 round, square, rectangle, diamond, etc. would also serve this purpose.

It bears emphasizing that the shape selection just described above in connection with the correction of geometric errors (i.e., function $f(d)$) is different from the shape selection described in connection with correction for misalignment. In other words, the inventive measurement apparatus may be configured with a user interface for two different shape selections by a user. The first shape selection is to select the expected 2D projection shape for the purpose of determining parallelism and/or perpendicularity (see FIGS. 4A, 4B and 5) for correcting misalignment (i.e., to correct for when the measuring plane is non-perpendicular to the camera principal axis). With the expected 2D shape known, the computing unit can analyze the image (as illustrated in FIGS. 4A-4B) and can further be mapped into a plane that is perpendicular to the camera principal axis. The second shape selection is to select the cross-sectional shape while measuring a side view 2D projection of the object for adjusting and correcting for perspective error. The selected cross-sectional geometry may make very little difference to the geometry as seen in the 2D projection image of the object. For example, the 2D projection will in very many cases be seen as a rectangle, even though the cross-sectional shape varies (e.g., a straight bar of different cross sectional shapes).

Figure 10:
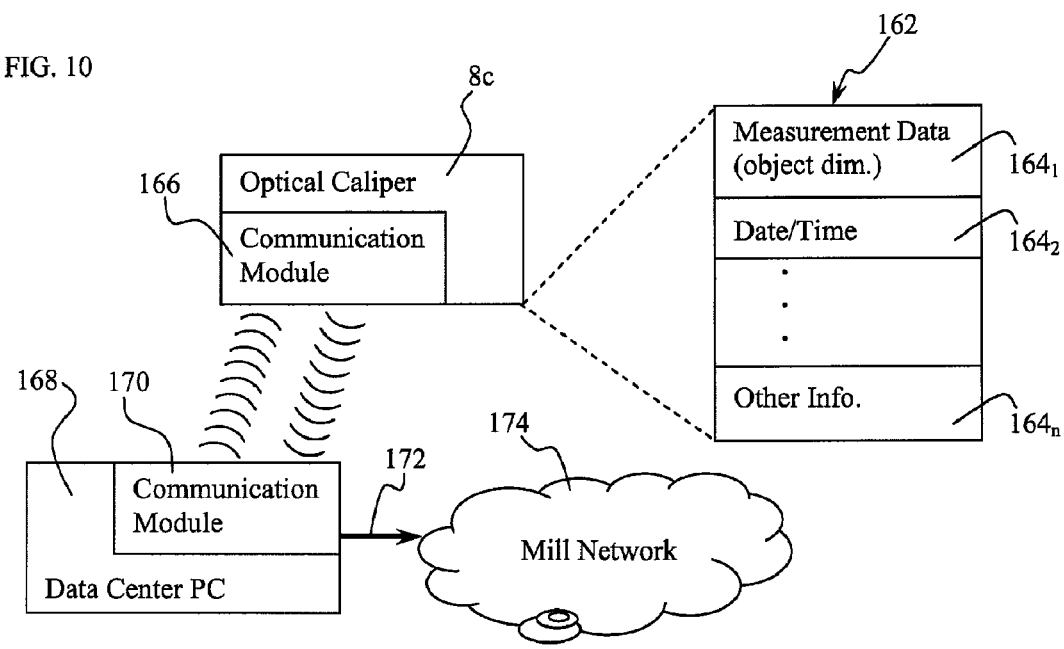
FIG. 10 is diagrammatic and block diagram view of distributed network that includes a still yet further embodiment a measurement apparatus in communication with a data center computer.

FIG. 10 is diagrammatic and block diagram view of distributed network that includes a further measurement apparatus embodiment 8c, shown in electronic communication with a data center computer. FIG. 10 shows that apparatus 8c may locally store various information 162 relating to the measurement event, for example, the measurement data $164_1$ (e.g., object dimension(s)), time/date $164_2$ when the measurement was taken, as well as other information $164_n$. In this embodiment, apparatus 8c includes a communication module 166 configured to transmit all or only a portion of such information 162 (e.g., measurement data $164_1$) to a data center computer 168 via its communication module 170. The communication module 170 may accommodate various wired connections known in the art, such as USB, RS232, TCP/IP (i.e., over Ethernet), to name a few but may also provide for wireless connections such as WiFi, Bluetooth, etc. (i.e., communication module 166 would be a wireless transmitting/receiving unit configured to operate in accordance with a predetermined wireless communication protocol—for example, one of a WiFi-compliant and Bluetooth compliant communication module).

The user of a measurement apparatus is likely to record the measurement result in a log or an equivalent as to when, where, what and how the measurement was taken. The communications function described above facilitates (and eases) the burden of recording measurement information from the user's point of view. In a further embodiment, the apparatus is configured for automatic logging of the measurement results. In a still further embodiment, data center 168 may have a communication line 172 coupling data center computer 168 to a local area network and/or wide area network (e.g., a steel mill network) for wider distribution and use of the object measurement data.

Figure 12:
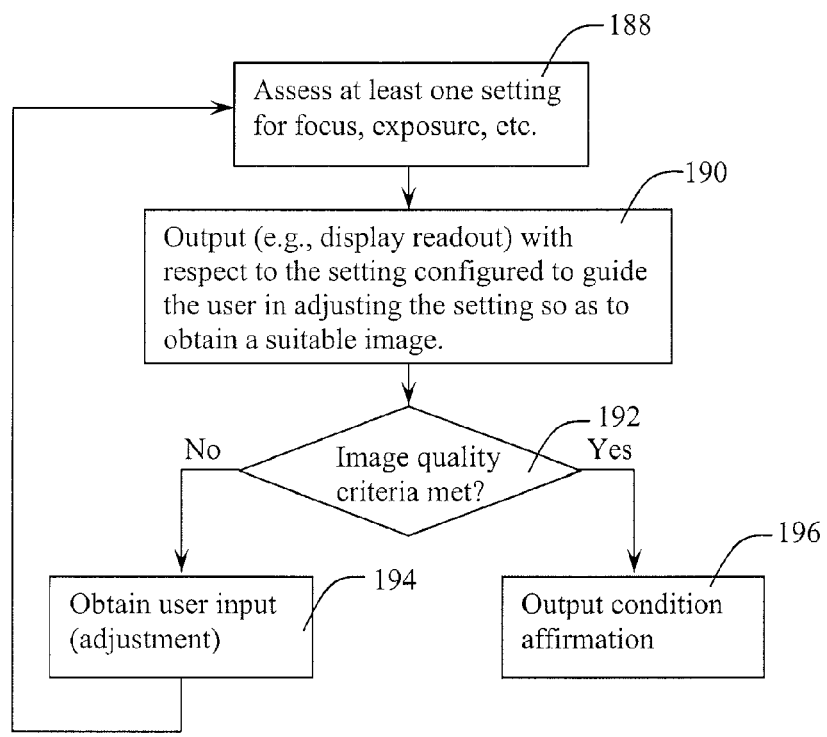
FIG. 12 is a flowchart diagram showing a method of guiding a user in making adjustments to certain settings, as may be incorporated in a still further measurement apparatus embodiment.

FIG. 12 is a flowchart diagram showing a method of guiding a user in making setting adjustments, as may be incorporated into a still yet further measurement apparatus embodiment. As described in the Background, those of ordinary skill in the art know that imaging sensors will not react to light linearly if the image is too dark (dark noise) or too bright (saturation). Therefore, it is necessary for the computing unit (i.e., computing units in the any of the embodiments, e.g. computing unit 110 in FIGS. 6A-6B) to provide a user interface to guide the user in making adjustments to pertinent exposure settings so that the image of interest is in the linear range of the imaging sensor. The guidance could be a brightness index of the image of interest (displayed to the user). It is also possible for the apparatus to automatically adjust the image brightness to a preset proper level through automatic gain adjustment or iris adjustment, or both. Likewise, those skilled in the art will appreciate the value of correct focus, and understand that correct focus can be facilitated through a focus index in the image (and displayed to the user) to guide the user or automatic focus adjustment.

In one embodiment, the measurement apparatus may include multiple readouts displayed on the screen (e.g., screen 112—FIG. 5B), which are refreshed continuously by the computing unit as the user adjusts the respective settings for focus, exposure, and the like. The readouts that are displayed would provide guidance as to when each setting has been adjusted into an acceptable range (e.g., too low, too high, acceptable range).

In an alternate embodiment, the measurement apparatus may include a composite readout displayed on the screen (e.g., screen 112—FIG. 5B), which is refreshed continuously as the user adjusts a single setting. The single readout that is displayed would provide guidance is the form of an "acceptable" or "not acceptable" adjustment. The user will only have to adjust a single setting until the output indicator is brought into an acceptable zone. In a still further embodiment, the measurement apparatus displays or otherwise outputs a "condition affirmation" when the setting(s) have been adjusted so as to result in an image meeting predetermined quality standards. As a further alternative, the use of the measurement apparatus itself may be disabled until the setting(s) have been adjusted into an acceptable zone. Disabling the measurement apparatus prevents measurement of dimension data that may be of questionable accuracy.

FIG. 12 is an exemplary method of implementing a user guidance interface feature. The method begins in step 188.

In step 188, the computing unit assesses at least one setting for focus, exposure or the like, as described above.

In step 190, the computing unit produces an output (e.g., a readout display screen) with respect to the setting (or settings) that was (were) just assessed, with the output(s) displays being configured to guide the user (as described above) in making needed adjustments so as to obtain a suitable image. A suitable image is one that meets predetermined quality standards so that the image can be relied on to produce an accurate measurement, such as that object in the image is in reasonable focus, the image is substantially gray scale (i.e., no saturation nor dark current situations), etc.

In step 192, the computing unit determines whether the predetermined image quality criteria are met (prospectively, looking at the focus, exposure, etc.). If the answer is "YES", then the method proceeds to step 196, where a "condition affirmation" is output by the computing unit indicating to the user that proper adjustments to the settings have been made (i.e., image will meet predetermined quality criteria) and the apparatus is now reading for taking a measurement. In some embodiments, the apparatus would be enabled to allow taking a measurement, if the apparatus had been previously disabled. However, if the answer is "NO" then the method branches to step 194 where the process is repeated (steps 188, 190, 192) after receiving further user input.

In step 194, the computing unit obtains (e.g., through an interface, such as hard keys or soft keys or other adjustable dials, rings, etc., as described in connection with the apparatus in FIGS. 6A-6B) further user input (i.e., adjustments to the setting(s)).

The foregoing steps described in connection with FIG. 12 may constitute a means or mechanism for enabling a user to adjust at least one setting for focus and exposure wherein the computing unit is configured to guide the user in adjusting such settings so as to obtain an image meeting predetermined quality criteria.

Still further variations are possible. For example, a measurement apparatus according to the invention can be configured with a user interface to allow a user to change the field of view (FOV) associated with the imaging system portion of the apparatus. For example, in one embodiment, a user can change the "zoom" level (i.e., the lens focal length) by adding fixed attached lens(es). The user interface is configured to allow the user to then change the zoom (or amplification) factor used in the processing logic described above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An apparatus for determining at least a dimension of an object having a three-dimensional (3D) geometry, said apparatus comprising:
    an imaging system configured to acquire an image of said object wherein said acquired image includes object boundaries representing a two-dimensional (2D) projection of the 3D object geometry;
    a parameter identifier configured to determine at least one calibration parameter; and
    a computing unit configured to determine said dimension of said object from said image using said at least one calibration parameter, wherein said computing unit further includes means for adjusting said at least one calibration parameter to correct for misalignment, said adjusting means being configured to convert said acquired image into a corrected image based on at least (i) said object boundaries in said acquired image and (ii) a predetermined, desired relationship that the object boundaries should have in the absence of misalignment between said apparatus and said object, said computing unit being further configured to determine said dimension using said corrected image.

2. The apparatus of claim 1 wherein said parameter identifier comprises one selected from the group comprising an optical triangulation apparatus, an interferometry-based system, a sonic/ultrasonic system and a combination of one or more of the foregoing.

3. The apparatus of claim 1 wherein said parameter identifier comprises means for detecting a signal indicative of a working distance, said parameter detecting means including a laser source configured in said apparatus to output a laser beam in a field of view of said imaging system, said laser beam being configured to produce a laser spot on said object capable of being imaged by said imaging system, said imaging system being further configured to acquire a calibration image of said object having a representation of said laser spot, said parameter identifier being configured to recognize said representation of said laser spot in said calibration image.

4. The apparatus of claim 3 wherein said parameter identifier is configured to determine a position of said representation of said laser spot in said calibration image, said parameter identifier being configured to determine a working distance between said imaging system and said object based on (i) at least said determined position of said representation of said laser spot and (ii) predetermined data associated with said laser source and said imaging system, said calibration parameter including said determined working distance.

5. The apparatus of claim 1 wherein said dimension comprises a two-dimensional (2D) projected dimension.

6. The apparatus of claim 1 wherein said calibration parameter comprises a working distance between said imaging system and said object.

7. The apparatus of claim 6 wherein said computing unit further includes:
means for determining an object dimension from said image in a pixel space;
means for establishing a dimensional model in accordance with at least said determined calibration parameter;
means for converting said object dimension in said pixel space into said object dimension in a physical space in accordance with at least said dimensional model.

8. The apparatus of claim 1 further including a mechanism for enabling a user to adjust at least one setting for focus and exposure, wherein said computing unit is further configured to guide the user in adjusting said settings so as to obtain said image meeting predetermined quality criteria.

9. The apparatus of claim 8 wherein said computing unit is configured to output a condition affirmation when said settings are adjusted such that said image meets said predetermined quality criteria.

10. The apparatus of claim 1 further comprising means for receiving power originating from a battery.

11. The apparatus of claim 1 further including a communication module configured to transmit measurement data including at least said determined object dimension.

12. The apparatus of claim 11 wherein said communication module comprises a wireless transmission unit configured to operate in accordance with a predetermined wireless communication protocol.

13. The apparatus of claim 12 wherein said communication module is one of a WiFi-compliant and a Bluetooth compliant module.

14. The apparatus of claim 11 wherein said communication module is configured to transmit said measurement data to a data center computer.

15. The apparatus of claim 1 wherein said at least one calibration parameter has an initial value and wherein said 3D geometry of said object includes a cross-sectional geometry of said object, said adjusting means further including:
means for determining a measured object dimension using the current value of said at least one calibration parameter;
means for computing a corrected object dimension as a function of the current measured object dimension wherein said function is defined at least in part on the cross-sectional geometry of said object;
means for determining a difference between the current corrected object dimension and the most recent corrected object dimension computed by said computing means;
means for updating said current value of said at least one calibration parameter when said difference is not less than a threshold;
means for calculating a final, measured object dimension based on said updated calibration parameter when said difference is less than said threshold.

16. The apparatus of claim 15 wherein said cross-sectional geometry is one of round, square, rectangle, diamond, oval, or hexagon.

17. The apparatus of claim 1 wherein said parameter identifier is configured to determine said at least one calibration parameter during said image acquisition.

18. The apparatus of claim 1 wherein said at least one calibration parameter includes an expected two-dimensional (2D) shape of said object in said acquired image.

19. The apparatus of claim 1 wherein said at least one calibration parameter includes said predetermined, desired relationship of said boundaries of said 2D projection of said object in said acquired image.

20. The apparatus of claim 1 wherein said computing unit includes a dimensional model configured to correct for said apparatus-to-object misalignment and to convert said object in said corrected image into said object dimension in a physical space.

21. An apparatus for determining at least a dimension of an object having a three-dimensional (3D) geometry, said apparatus comprising:
an imaging system configured to acquire an image of said object wherein said acquired image includes object edges representing a two-dimensional projection of the 3D object geometry;
a parameter identifier configured to determine at least one calibration parameter;
a computing unit configured to determine said dimension of said object from said image using said at least one calibration parameter, wherein said calibration parameter further includes at least one of (i) a parallelness parameter indicative of a degree to which a pair of edges in said image of said object in a two-dimensional (2D) projection thereof are adjusted so as to be substantially parallel to each other in said image, (ii) a perpendicularity parameter indicative of a degree to which a pair of edges in said image of said object in a two-dimensional (2D) projection thereof are adjusted so as to be substantially perpendicular to each other in said image and (iii) a roundness parameter indicative of a degree to which an edge in said image of said object in a two-dimensional (2D) projection thereof are adjusted so as to be substantially a partial or a full circle in said image, at least one of said parallelness parameter, said perpendicularly parameter and said roundness parameter being determined so as to allow said computing unit to correct for misalignment of said apparatus relative to said object while determining said dimension.

22. The apparatus of claim 21 wherein said computing unit is configured to provide a user interface configured to obtain a selection from a user as to an expected shape of said 2D projection in said image.

23. The apparatus of claim 22 wherein said computing unit is configured to determine said at least one of said parallelness parameter, said perpendicularity parameter and said roundness parameter in accordance with said user-selected expected shape of said 2D projection image.

24. The apparatus of claim 21 wherein said computing unit is configured to provide a user interface configured to obtain an assignment from a user as to an expected relation of parallelness, perpendicularity or roundness in the edge(s) of said 2D projection in said image.

25. The apparatus of claim 21 wherein said parameter identifier comprises one selected from the group comprising an optical triangulation apparatus, an interferometry-based system, a sonic/ultrasonic system and a combination of one or more of the foregoing.

* * * * *